INVENTOR.
WILLIAM O. SIMS
ATTORNEYS.

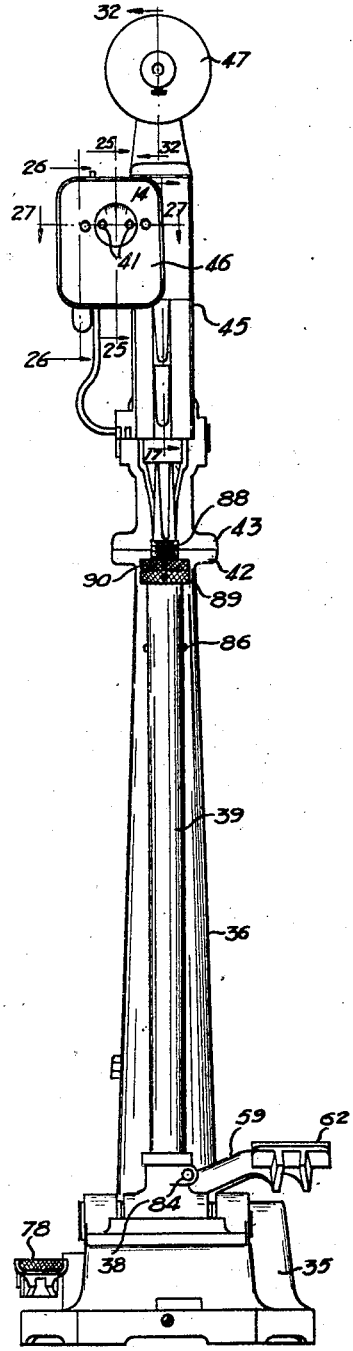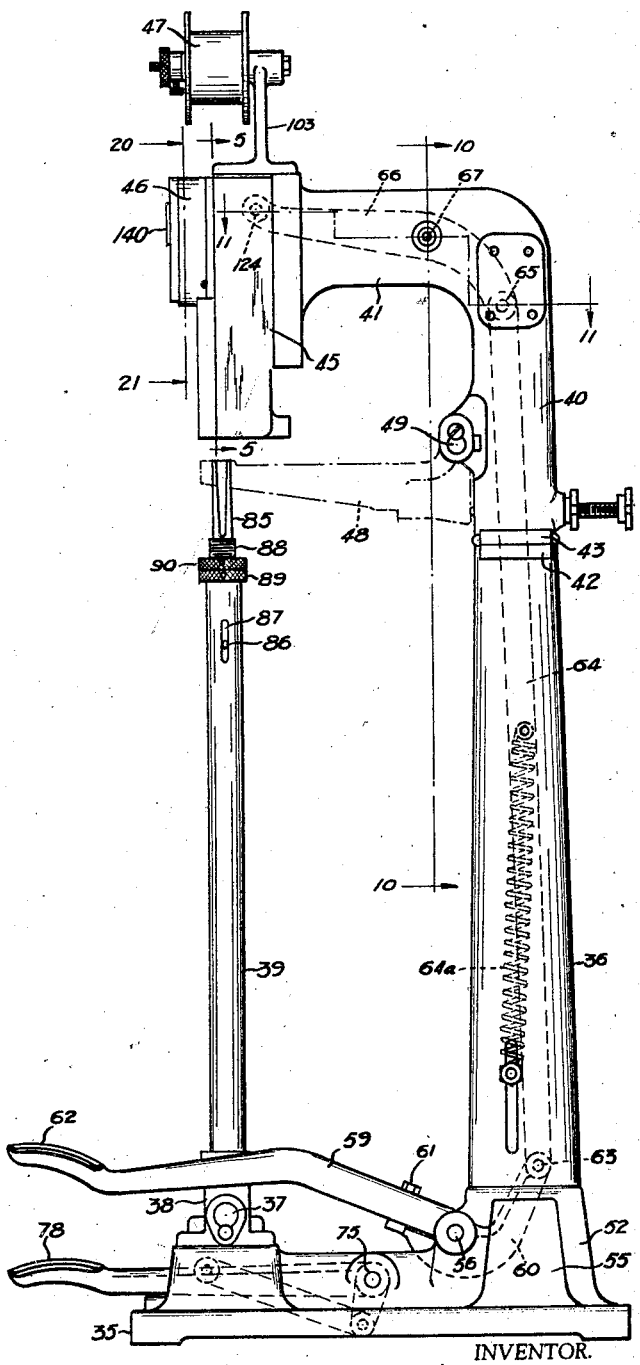

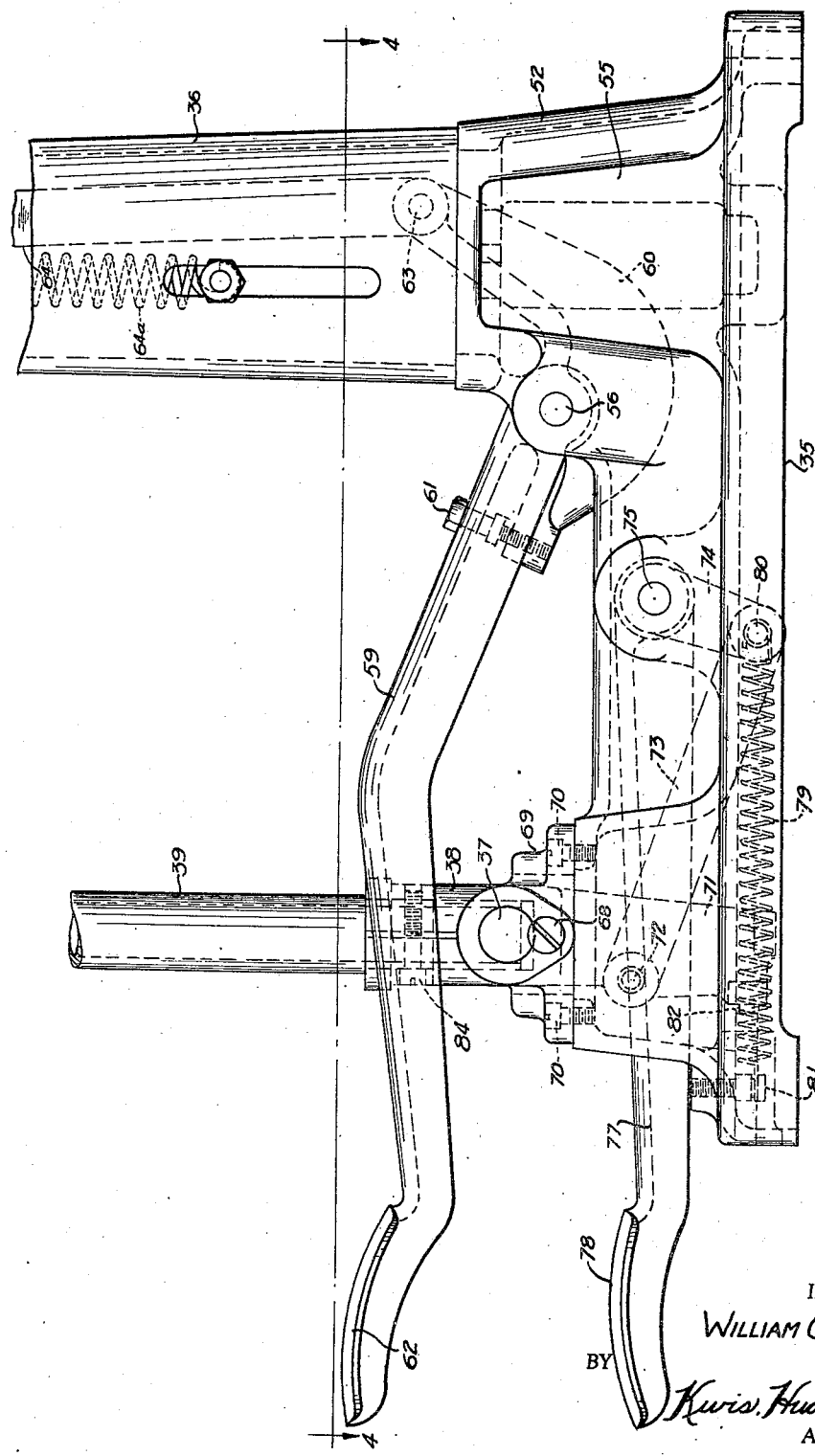

April 25, 1939.　　　　W. O. SIMS　　　　2,156,165

BOX STITCHER

Filed July 15, 1935　　　12 Sheets-Sheet 5

INVENTOR.
WILLIAM O. SIMS
BY
Kwis, Hudson & Kent
ATTORNEYS.

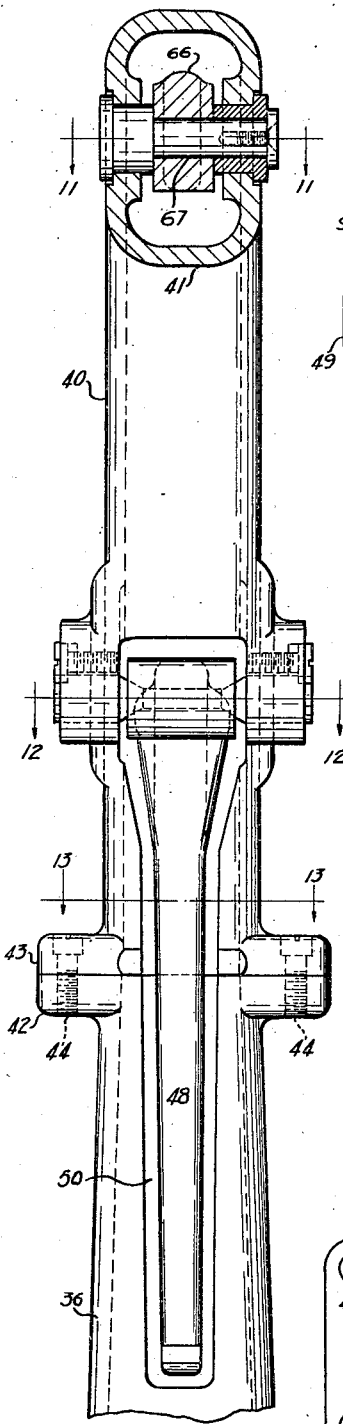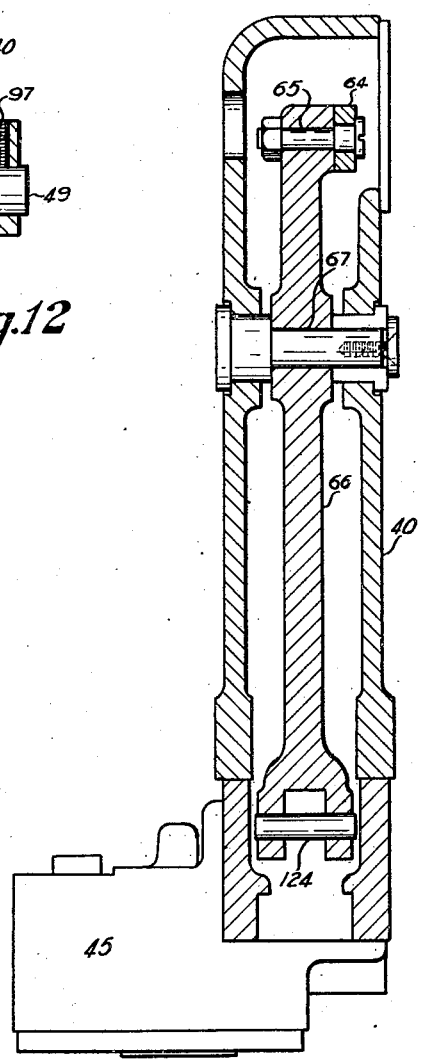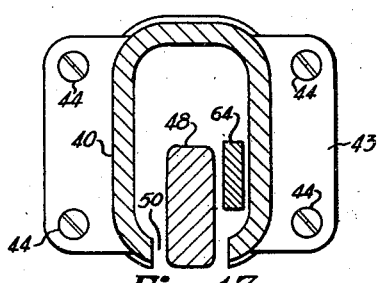
Fig. 10  Fig. 11  Fig. 12  Fig. 13
INVENTOR.
WILLIAM O. SIMS
ATTORNEYS.

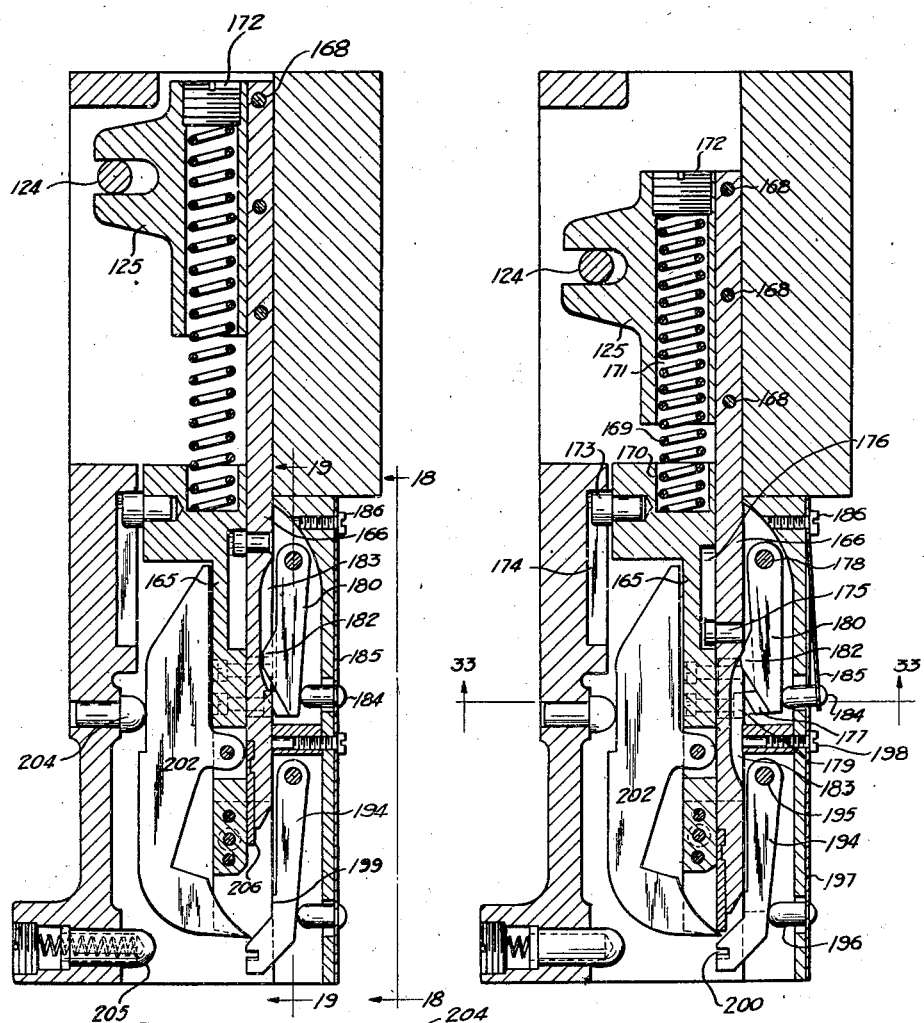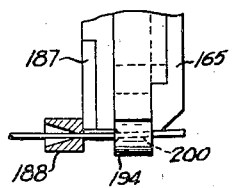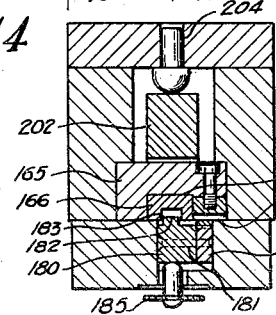

April 25, 1939. W. O. SIMS 2,156,165
BOX STITCHER
Filed July 15, 1935 12 Sheets-Sheet 8

INVENTOR.
WILLIAM O. SIMS.
BY
Kurio, Hudson & Kent
ATTORNEYS.

April 25, 1939.  W. O. SIMS  2,156,165

BOX STITCHER

Filed July 15, 1935   12 Sheets-Sheet 9

INVENTOR.
WILLIAM O. SIMS.
Kwis, Hudson & Kent
ATTORNEYS.

April 25, 1939.  W. O. SIMS  2,156,165

BOX STITCHER

Filed July 15, 1935   12 Sheets-Sheet 10

INVENTOR.
WILLIAM O. SIMS.
BY
Kwis, Hudson & Kent
ATTORNEYS.

INVENTOR.
WILLIAM O. SIMS
BY
*Kwis, Hudson & Kent.*
ATTORNEYS.

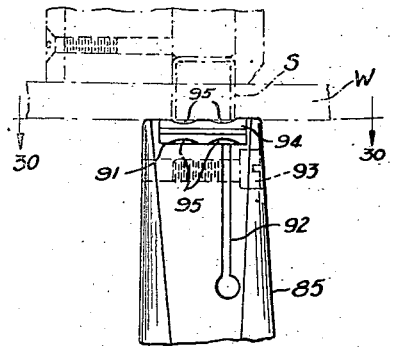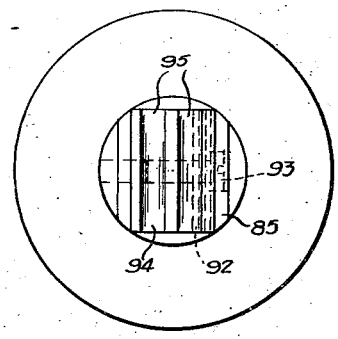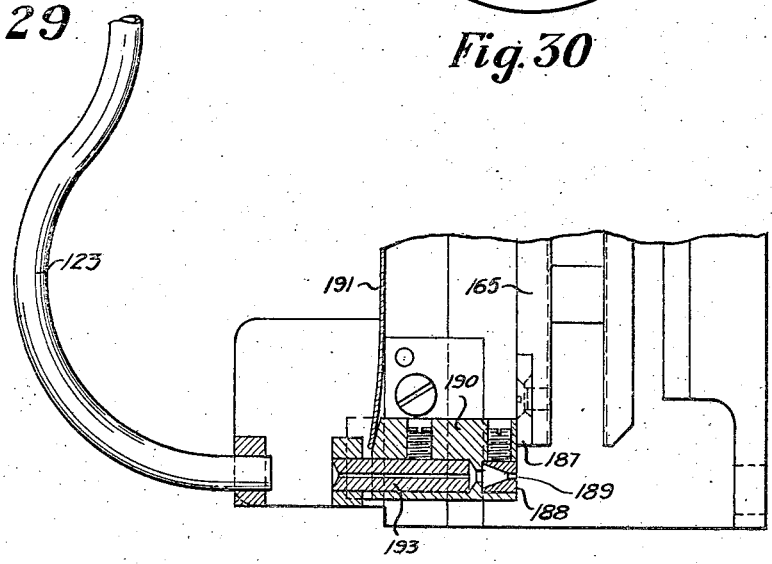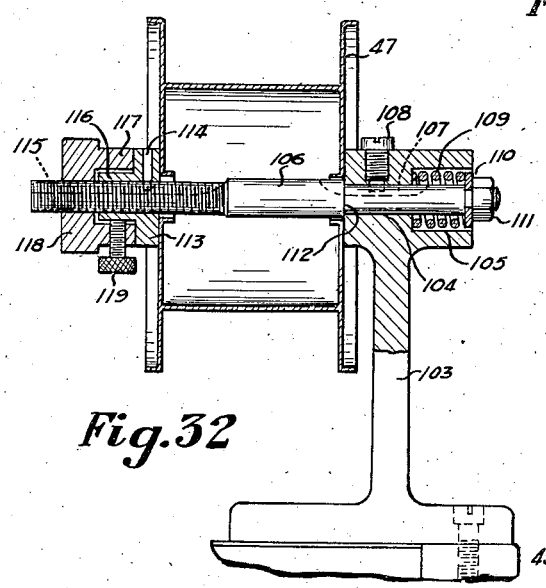

Patented Apr. 25, 1939

2,156,165

UNITED STATES PATENT OFFICE 2,156,165

BOX STITCHER

William O. Sims, Niagara Falls, N. Y., assignor to Harris-Seybold-Potter Company, Cleveland, Ohio, a corporation of Delaware Application July 15, 1935, Serial No. 31,349

12 Claims. (Cl. 1—2)

This invention relates to improvements in box stitchers, that is to say improvements in stapling machines designed particularly for use in securing together in operative relation the various parts of fiberboard boxes from blanks cut to proper dimensions for the purpose.

One of the objects of the invention is the provision of a low cost manually operated machine of this character which shall be convenient and effective in operation.

Another object is the provision of a novel stitcher head mechanism capable of easy manual operation.

Another object is the provision of stitcher mechanism embodying a load and fire operation of the former slide, the feeding of the wire for the staple being effected while the energy for driving the former slide is being built up.

Still another object is the provision of a novel clincher arm so constructed and mounted as to be capable of being folded into the machine column when not in use, where it is entirely out of the way and cannot detract from the neat appearance of the machine.

Another object is the provision of an effective and quickly adjustable spool mounting comprising tension means for retarding or damping spool rotation to the desired extent.

Another object is the provision of a novel wire feed.

Still another object is the provision of novel pedal mechanisms for operating the stitcher head and for tilting the clincher post.

Other objects and features of novelty will appear as I proceed with the description of that embodiment of the invention which, for the purposes of the present application, I have illustrated in the accompanying drawings, in which—

Fig. 1 is a side elevational view of a machine embodying the invention.

Fig. 2 is a front elevation of the same.

Fig. 3 is a side view on a larger scale showing the base of the machine with the pedals and their connections.

Fig. 10 is a fragmental elevational view, partly in section on the line 10—10 of Fig. 1, showing the clincher arm in folded position.

Fig. 11 is a horizontal sectional view at the position indicated by line 11—11 of Fig. 10, and also by the line 11—11 of Fig. 1, but viewed from the side opposite that shown in Fig. 1.

Fig. 12 is a horizontal section substantially on the line 12—12 of Fig. 10.

Fig. 13 is a horizontal section on the line 13—13 of Fig. 10.

Figs. 14, 15, 16 and 17 are vertical sectional views taken substantially on the line 14—17 of Fig. 2, showing the stitching mechanism in successive positions on the operating or down stroke.

Fig. 29 is a detail elevational view showing a fragment of the upper end of the clincher post with its reversible clincher block.

Fig. 30 is a plan view of the same, as indicated by the line 30—30 of Fig. 29.

Fig. 31 is a fragmentary elevation of the lower end of the stitcher head with the wire guide, showing parts selected and adjusted to cut short staples.

Fig. 32 is a detail view of the wire spool and its mounting, the view being taken principally in vertical section on the line 32—32 of Fig. 2, but on a larger scale.

Fig. 33 is a horizontal sectional view taken substantially on the line 33—33 of Fig. 15.

Fig. 34 is a diagrammatic view showing a length of wire about to be cut off to form a staple.

Similar reference characters refer to like parts throughout the views.

Figure 4:
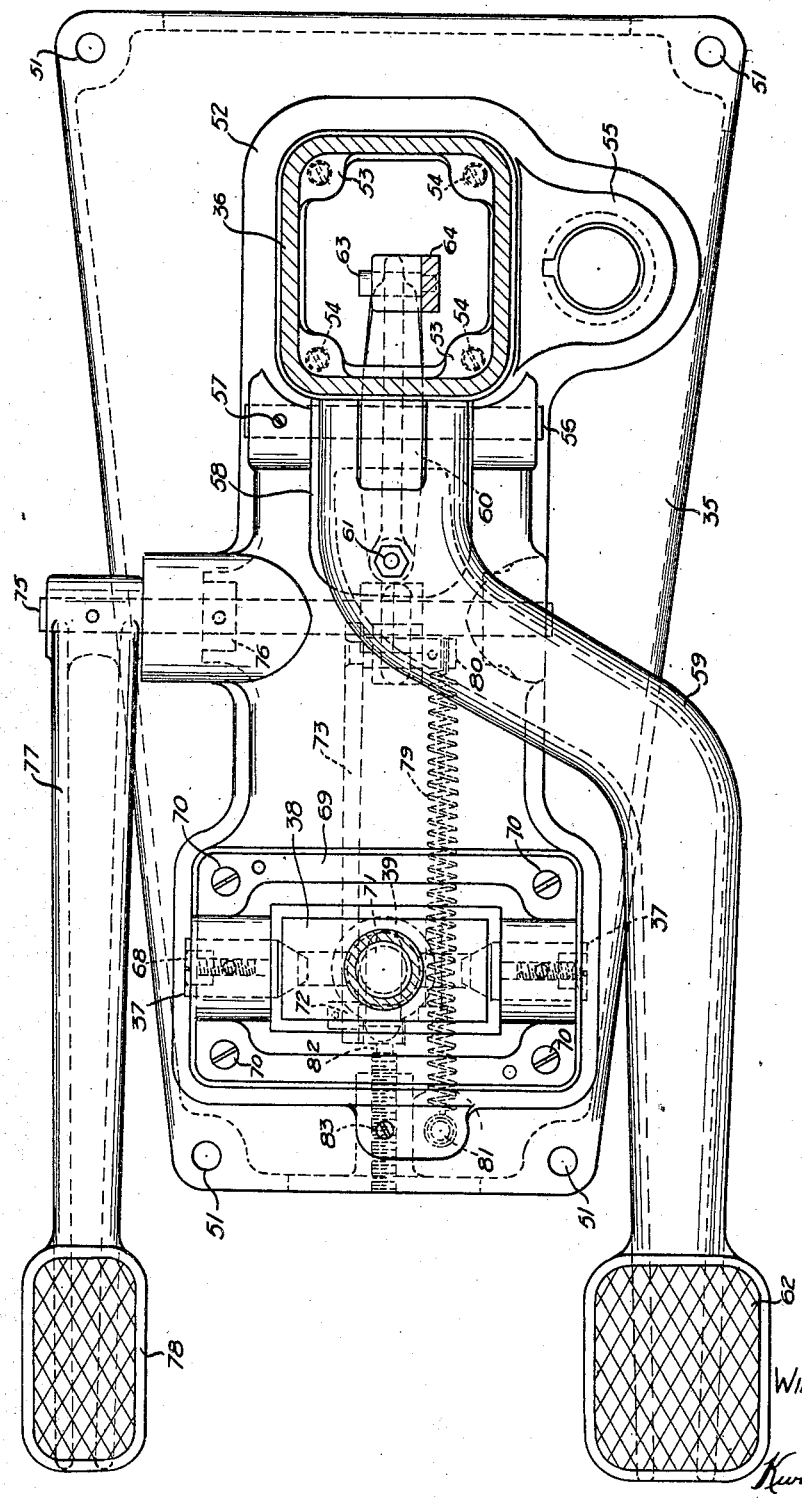
Fig. 4 is a plan view of the same partially in section on the line 4—4 of Fig. 3.

Referring first to Figs. 1 and 2, 35 is the base of the machine formed as a casting which is sufficiently heavy to lend considerable stability to the structure. To the rear end of the base there is attached a hollow column 36. Near the front end of the base there are aligned pivots 37 supporting a post holder 38 in which is mounted a clincher post 39. The upper end 40 of the column is formed separately and includes a forwardly extending horizontal arm 41, the parts 40 and 41 both being hollow. The lower and upper sections 36 and 40 of the column may be provided with flanges 42 and 43, which may be secured together by means of screws 44, see Fig. 10. On the forward end of arm 41 is mounted the stitcher head 45, which carries the wire feed housing 46 and the mounting for the wire spool 47. A clincher arm 48 is hinged at 49 on the column, and is adapted to fold down into the column through a slot 50 formed in the forward wall thereof. Having referred briefly to the principal elements of the machine, I will now describe the various parts more in detail.

*Base and foot levers.*—The base 35 is preferably provided with holes 51 through which fastenings may extend, by means of which the machine may be secured to a floor. Near the rear end of the base there is formed a large hollow boss 52 which is provided with a shouldered seat for the reception of the column section 36, the latter preferably having integral internal corner blocks 53 provided with threaded holes which receive screws or the like 54 that are mounted in the boss 52 and extend upwardly therefrom. By this means the column section 36 is rigidly supported. A second, somewhat smaller, boss 55 is formed alongside boss 52, and is made hollow to conveniently receive and hold the post 39 when the latter is not in use.

In the base just in advance of boss 52 I mount a shaft 56 which is preferably held from rotation by a screw 57. The shaft 56 extends across a cavity 58 in the base into which projects the rear end of a foot pedal 59, whose rear extremity is bifurcated and is rotatably mounted upon the shaft 56. There is also mounted on the shaft 56 between the bifurcations of the pedal 59 a lever 60, which is shaped somewhat like a crescent. The forward end of this lever is adjustably connected with pedal 59 by a screw 61. By means of this screw the angle between the pedal and the lever may be varied, in order that the height of the foot pad 62 on the front end of the pedal may be changed to suit the convenience of the operator. In the operation of the machine the pedal 59 and the lever 60 of course move as one lever. On its rear end the lever 60 is connected by means of a pivot 63 with the lower end of a reciprocating link or bar 64, the upper end of the latter being pivoted at 65 to a lever 66 inside the hollow arm 41, this lever being pivotally mounted at 67. The forward end of pedal 59 is offset, as illustrated in Fig. 4, so as to lie to one side of the base. After actuation the foot pedal and bar 64 are returned to normal position by a spring 64a.

The post holder 38, as previously mentioned, is mounted upon pivots 37. These pivots are cylindrical members, each of which has an inner end formed as a frustum of a cone, the holder 38 having aligned bearing openings receiving the conical inner ends of the pivots 37. These pivots may be adjusted inwardly by means of screws 68 having large flat heads which engage flat seats in the outer ends of the pivots 37. These pivotal mountings are carried entirely by a separable plate or cover 69 which is removably secured in position on the base by screws 70.

The post support 38 which tilts upon the pivots 37 includes a depending extension 71 which projects down through an opening in the hollow base. The extension 71 is pivotally connected at 72 to the forward end of a link 73, the rear end of which is pivoted to a crank 74 that is keyed to a rock shaft 75 mounted in the base parallel to the shaft 56. This shaft 75 is held against movement longitudinally in one direction by a collar 76 pinned to the shaft and bearing against a side wall of the base 35, and, in the other direction by the hub of a pedal 77 pinned to the shaft outside of the base. The pedal 77 is therefore arranged outside of the base on the side opposite the pedal 59, and the foot pad 78 of this pedal is preferably arranged substantially opposite the foot pad 62. The operator stands between these two foot pedals in a position which makes it convenient for him to press upon the pad 62 with his right foot and upon the pad 78 with his left foot.

When the pedal 77 is depressed the crank 74 swings toward the rear and the link 73 pulls the extension 71 rearwardly, thereby tilting the upper end of the post 39 forwardly and moving it out from under the stitcher head 45, so that a completed box may be removed from the post and a new blank put in position over the post for stitching.

In order that the post 39 may return automatically to operative position when pressure upon the pedal 77 is released, I attach a coil spring 79 to the pivot 80 which connects crank 74 and link 73. This spring extends forwardly to the front end of the base where it is anchored by some convenient means, as for instance by attachment to a threaded stud 81. This spring of course acts through link 73 to swing the post support on its pivots, forcing the extension 71 forward. Its movement in the latter direction is limited by stop 82 which is threadably mounted in the base 35 and may be locked in a desired position of adjustment by a set screw 83. By means of this adjustable stop it is evident that the post 39 may be brought into accurate alignment with the stitcher head mechanism, that is in so far as its position in the principal vertical plane of the machine is concerned.

The post 39 has a reduced lower end which fits within a bore of the post support 38. This part of the support is split, and a clamping screw 84 extends across the split and when tightened binds the post securely. The post 39 is cylindrical, and in its upper end it carries a clincher holder 85, the lower portion of which fits slidably within the post. The holder is held against turning in the post by a pin 86 which projects through aligned slots 87 in the post 39 and through a hole in the holder 85. In order that the clincher holder may be adjusted vertically, it is provided with an externally threaded portion 88 upon which is mounted a nut 89 that rests upon the top edge of the post. Above the nut 89 there is a lock nut 90.

*The reversible clincher block.*—In Figs. 29 and

30 I have shown the upper part of the clincher holder 85. It will be observed that a recess 91 with straight side walls is formed in the holder, and that the holder has a vertical split 92 therein running from the front to the rear of the holder. The right and left portions of the holder on opposite sides of the split 92 are arranged to be drawn together by a screw 93, so as to clamp the clincher block 94 securely in place. The block 94 on both of its opposite surfaces has a pair of parallel shallow grooves 95 which extend the entire length of the block from front to rear and serve to turn in or clinch the legs of a staple when the latter is driven downward through the work as indicated in Fig. 29, where the staple is marked S and the work is marked W. It will be apparent that no adjustment of the clincher block in a direction parallel to the principal vertical plane of the machine is necessary, since the grooves 95 are much longer than the width of the wire from which the staple is formed. The length of life of the clincher block is doubled by forming the grooves 95 in two surfaces rather than in one, enabling the operator to reverse the block after the clinching surfaces on one side thereof have become unduly worn.

Figure 6:
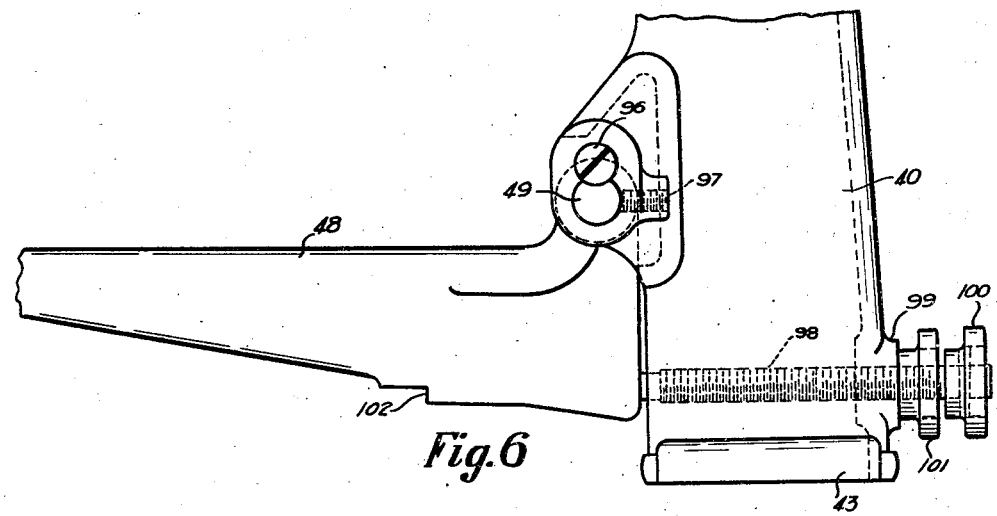
Fig. 6 is a fragmental detail side elevational view of a portion of the machine column, with the clincher arm in operative position.
Figure 9:
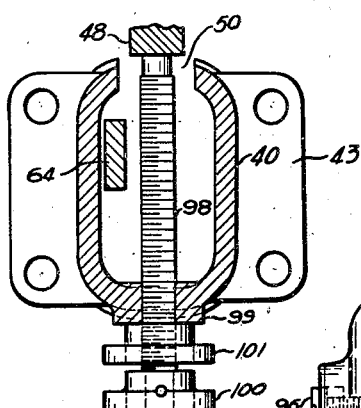
Fig. 9 is a horizontal sectional view taken substantially on the line 9—9 of Fig. 8.
Figure 7:
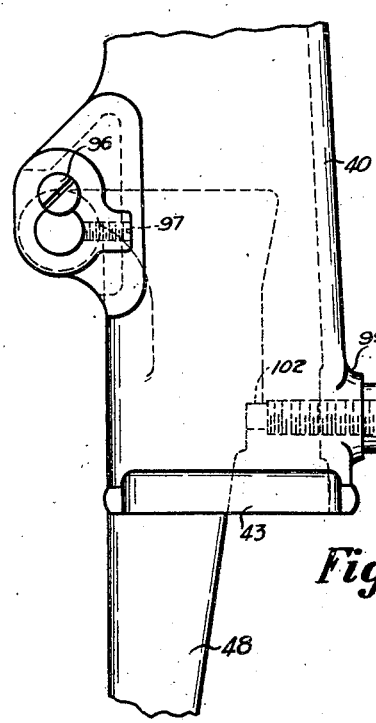
Fig. 7 is a similar view with the clincher arm swung down into inoperative position.
Figure 8:
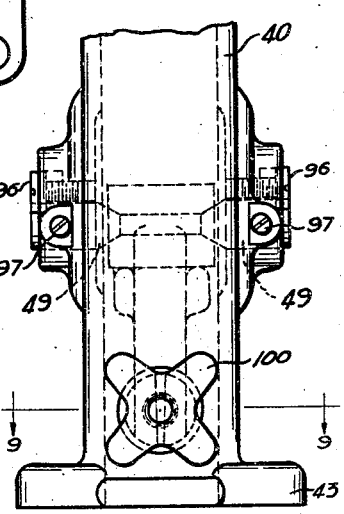
Fig. 8 is a rear elevation of the structure shown in Fig. 6.

*Disappearing clincher arm.*—For certain classes of work the clincher post 39 is removed from the post holder 38 after the clamping screw 84 has been loosened, and the post is then stored by slipping it into the socket formed in the boss 55 of the base. Clinching of the staples is then performed by a clinching block in the outer end of the clincher arm 48 previously mentioned. Arm 48 is supported on pivots 49 that are adjustable for wear by means of headed screws 96, and are locked in adjusted position by set screws 97. The pivots 49 are preferably so located that they occupy a position near the front of the hollow column section 40 and near that edge of the arm 48 which is uppermost when the arm is in operative position. In the latter position the arm is supported by a screw 98 that is threadably mounted in a boss 99 in the rear wall of the column, the forward end of the screw abutting against the rear end of the arm 48, as shown particularly in Figs. 6 and 9. Any convenient means may be provided for turning the screw 98, that illustrated consisting of a small hand-wheel 100 pinned to the screw. I also provide a lock nut 101 with a hand-wheel grip, which may be turned up against the boss 99 to hold the parts firmly against accidental displacement. When it is desired to retract the arm 48, the nut 101 is loosened and the screw 98 is turned backwardly to an extent somewhat greater than that indicated in Fig. 7. The arm 48 is then free to fall by gravity to a position somewhat forward of that illustrated in Fig. 7, that is far enough to permit the shoulder 102 to pass the end of the screw. The operator then pushes the lower end of the arm 48 in flush with the forward surface of the column, and turns the screw 98 forward causing it to engage firmly beneath the shoulder 102, thereby securing the arm in retracted position, when the nut 101 may again be turned forward into engagement with the boss 99. It will be observed that the operating bar 64 is so arranged in the hollow column as to clear the arm 48 and the screw 98, both of which are substantially in the middle plane of the column.

*Spool mounting.*—An upstanding bracket 103 is bolted or otherwise secured to the top of the stitcher head 45. In the upper part of this bracket there are horizontal, intercommunicating, axially aligned bores 104 and 105 of different diameters, as shown in Fig. 32. The reduced rear end of a spindle 106 fits slidably in the bore 104 and projects through the bore 105. The spindle is free to move longitudinally in the bracket, having a keyway 107 which is engaged by the smooth end of a set screw 108 mounted in the bracket. A coil spring 109 positioned in bore 105 surrounding the spindle engages a washer 110 on the spindle held in place by a nut 111. The spring 109 exerts force tending to move the spindle rearwardly and to hold shoulder 112 on the spindle up against the forward face of the bracket.

The spindle 106 is adapted to receive a metallic or other spool 47 upon which the wire for the staples is wound. One side wall of the spool bears against the forward surface of bracket 103 surrounding the spindle opening therein, and these engaging surfaces present friction which is utilized to prevent rotation of the spool more rapidly than the rate of feed of the wire required. Other friction surfaces are provided on the forward side of the spool by a collar 113 with a smooth bore and with a flat rear face engaging the forward wall of the spool. This collar is held against rotation by a pin 114 which projects into a groove or keyway 115 in the forward threaded end of spindle 106. The collar 113 has a forwardly extending hub 116, and this hub is surrounded by an annular flange 117 on a nut 118 which is threadably mounted on the spindle. A set screw 119 is threaded through the flange 117 and may be caused to engage the hub 116 of collar 113 when any desired adjustment of nut 118 has been effected, thereby preventing any accidental variation of the adjustment. It will be apparent that when the nut 118 is tightened down the collar 113 is forced rearwardly and the spindle 106 is pulled forwardly against the tension of spring 109, increasing the friction on both sides of the spool, and that loosening the nut 118 has the opposite effect.

Figure 5:
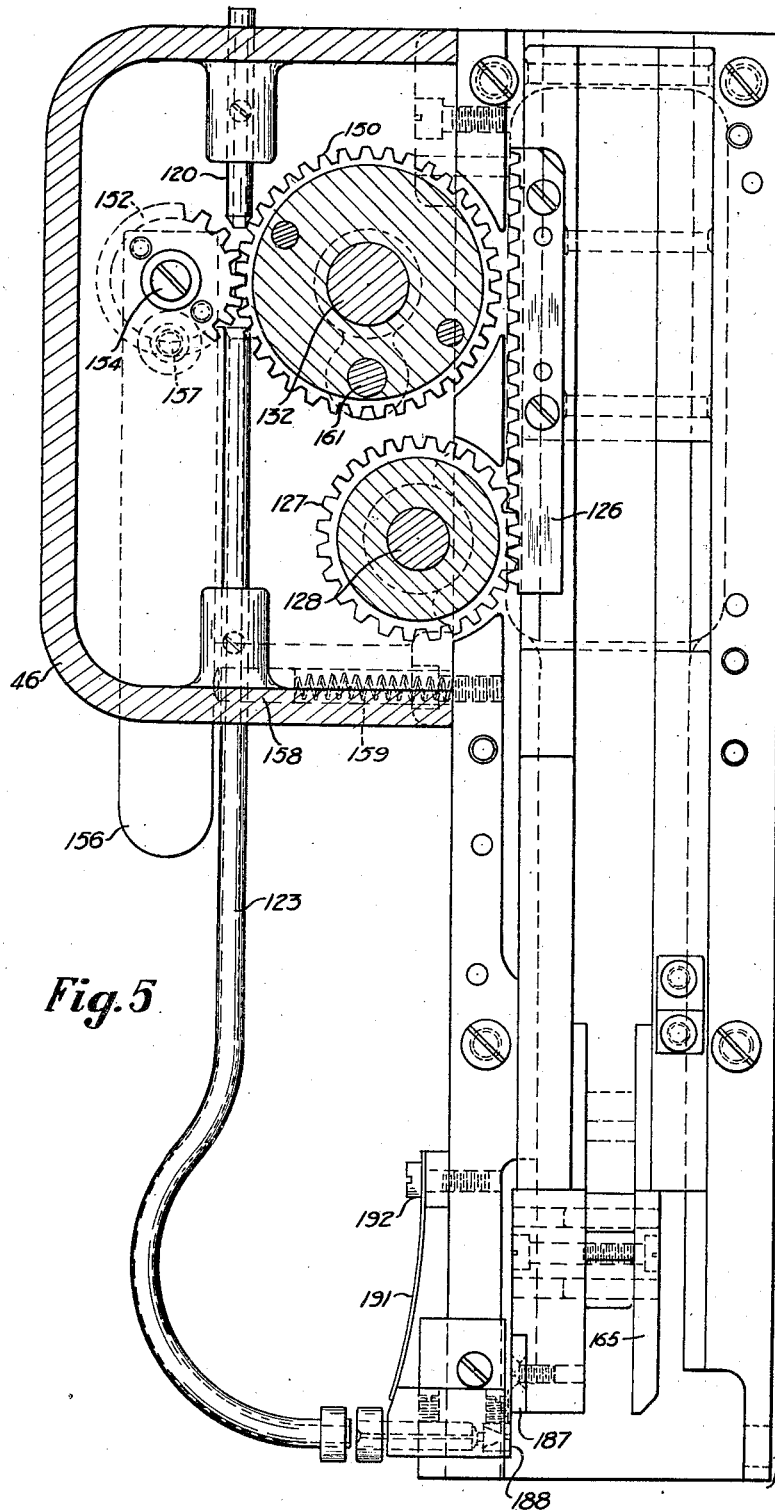
Fig. 5 is an elevational view of the stitcher head and wire feed partially in section on the line 5—5 of Fig. 1, but on a larger scale.
Figure 26:
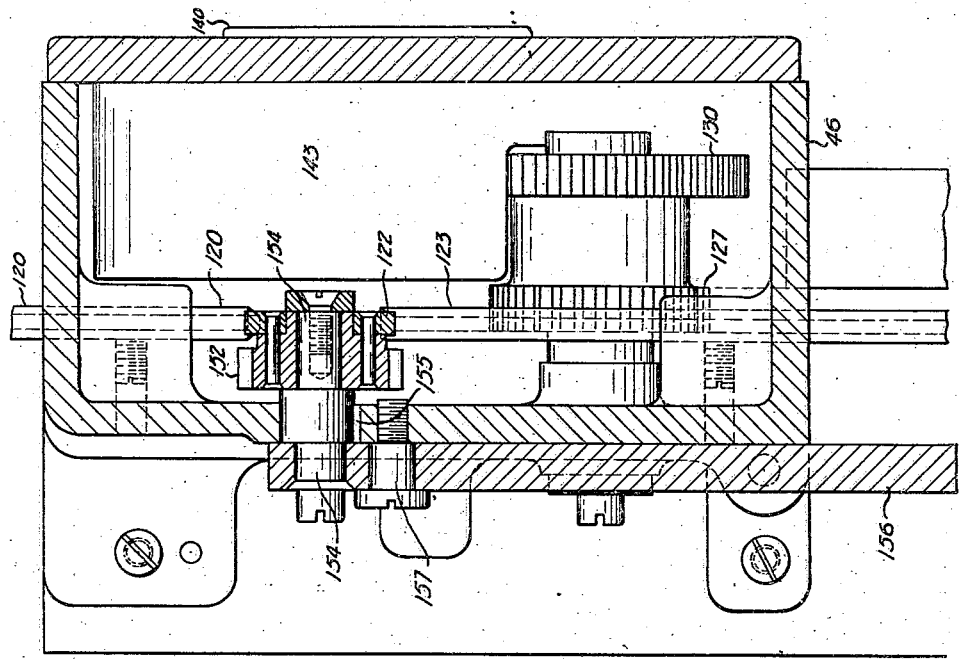
Fig. 26 is a vertical sectional view taken substantially on the line 26—26 of Figs. 2 and 27.
Figure 27:
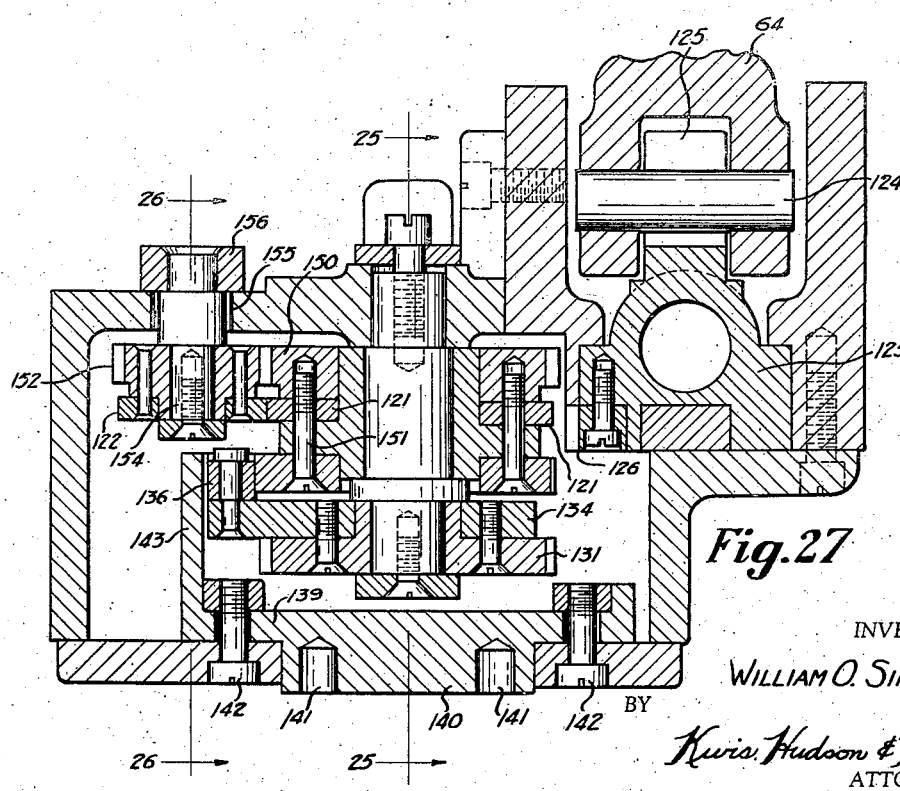
Fig. 27 is a horizontal sectional view of the wire feed taken substantially on the line 27—27 of Figs. 2 and 25.

*Wire feed.*—Wire coming down off the spool 47 enters a tubular guide 120 carried in the upper wall of the wire feed housing 46, Figs. 5 and 26, is gripped between two feed rollers or disks 121 and 122, Fig. 27, and passes into another tubular guide 123 carried by the lower wall of the housing 46, and thence down to the lower end of the stitcher head where the staple is formed.

Figure 28:
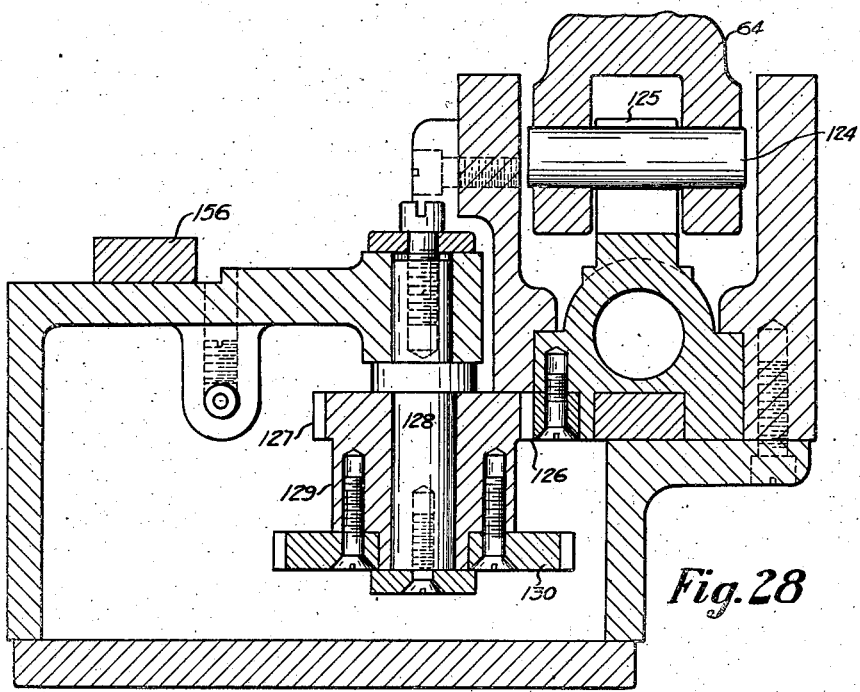
Fig. 28 is a horizontal sectional view taken substantially on the line 28—28 of Fig. 25.

The forward end of the rocking lever 64 is forked, as plainly illustrated in Figs. 27 and 28. These forks carry a pin 124 which is received by vertically spaced jaws of a cross-head 125. This cross-head moves vertically in guides formed in the stitcher head 45 of the machine. To it is attached by any suitable means a rack 126 which meshes with a pinion 127 rotatably mounted upon a fixed spindle or shaft 128. Pinion 127 has a forwardly extending hub 129 to which is secured a gear 130 that meshes with a similar gear 131 which is free to rotate upon the forward end of a stub shaft 132. To the back of gear 131 there is attached by means of screws 133 a pawl holder 134 which extends at one point beyond the periphery of the gear, where it carries a pivot 135. A pawl 136 is mounted on this pivot. The tail of the pawl 136 is extended sidewise and is engaged by a pin 137 slidably mounted in the holder 134 and pushed outwardly by a coil spring 138. This spring and pin tend to move the pawl to operative position.

Figures 22, 23, 24:
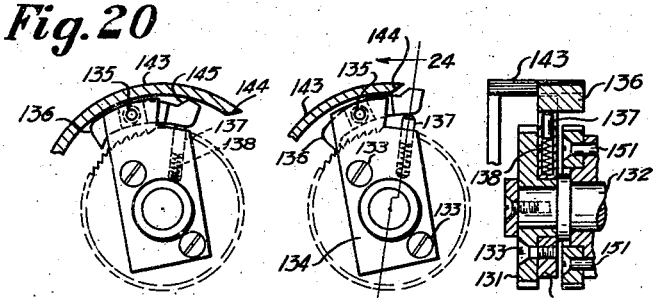
Figs. 22 and 23 are detail elevational views of a pawl and pawl holder used in connection with the wire feed.
Fig. 24 is a detail sectional view of the same taken substantially on the line 24—24 of Fig. 23.

Directly behind the front wall of the gear housing 46 there is a circular plate 139 which has a central thickened portion 140 that extends through a circular hole in the front wall of the housing. In this thickened portion there are two spanner wrench holes 141 by means of which the plate may be turned for adjustment purposes. It is held against accidental displacement by bolts 142 which extend through arcuate slots in the plate. Extending through about half the periphery of the plate 139 there is an inwardly projecting flange 143 which is wide enough to overhang the pawl holder 134 and pawl 136. At one end this flange has a beveled surface 144. There is a correspondingly beveled surface 145 on the tail end of pawl 136. When the pawl holder rotates counterclockwise, as viewed in Figs. 20 to 23 inclusive, to the point where the beveled surfaces 144 and 145 engage each other, the pawl 136 is rocked on its pivot and withdrawn from operative position. During further rotation in the same direction the tail end of the pawl slides upon the inner surface of flange 143 and the forward or toothed end of the pawl is held out of operative position, as indicated in Fig. 22.

Figure 25:
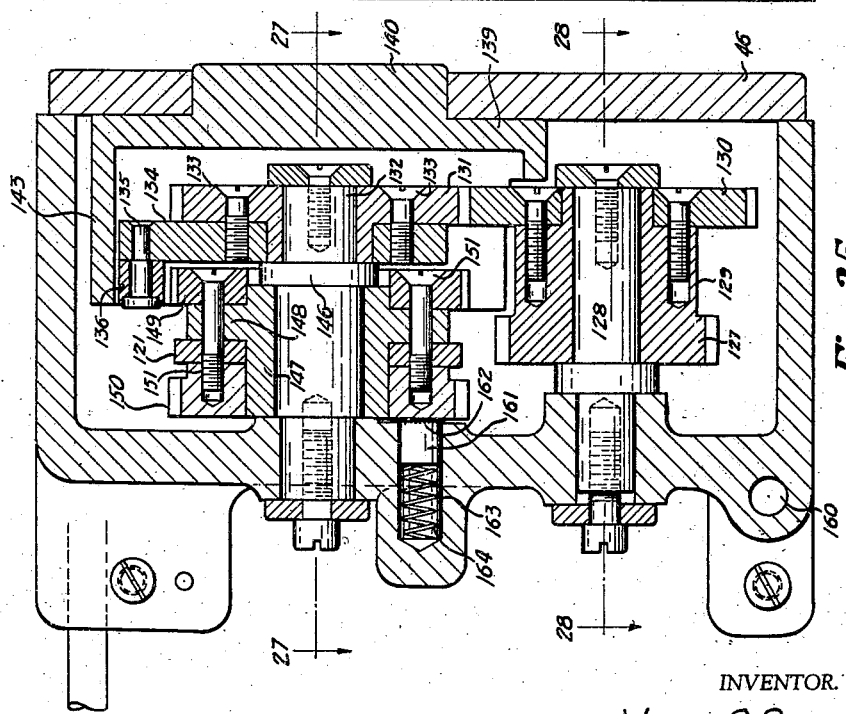
Fig. 25 is a vertical sectional view showing a portion of the wire feed mechanism, taken substantially on the line 25—25 of Figs. 2 and 27.

Intermediate the ends of the stub shaft 132 there is an integral collar or flange 146. On the rear side of this collar I mount a sleeve 147 with an annular flange 148. The sleeve 147 carries an annular ratchet wheel 149 on one side of the flange 148, and on the other side it carries one of the wire feed rollers or disks 121 and a ring gear 150. The parts 149, 121 and 150 are all secured to each other and to the flange 148 by several screws 151, as indicated particularly in Figs. 25 and 27.

A small gear 152 meshes with gear 150 and rotates freely upon a stub shaft 154 which extends loosely through a slot 155 in the gear housing, and is anchored outside of the housing in the upper end of a lever 156 which is pivotally mounted on a stud 157 mounted in the housing 46, as shown particularly in Fig. 26. The lower end of this lever is urged toward the left, as viewed in Figs. 2 and 5, by plunger 158 and coil spring 159 mounted in a bore 160 in the rear wall of the housing, see Fig. 25. By this means the wire feeding idler roller 122 is held yieldably in wire gripping relation with roller 121.

In order to prevent the sleeve 147 and the parts carried thereby from turning in a reverse direction, I provide a friction brake consisting of a plunger 161 with a leather facing 162, the plunger being slidably mounted in a bore 163 in the rear wall of the housing and being backed by a coil spring 164 which is also mounted in bore 163 and holds the plunger with predetermined force against the rear face of the gear 150.

Figure 20:
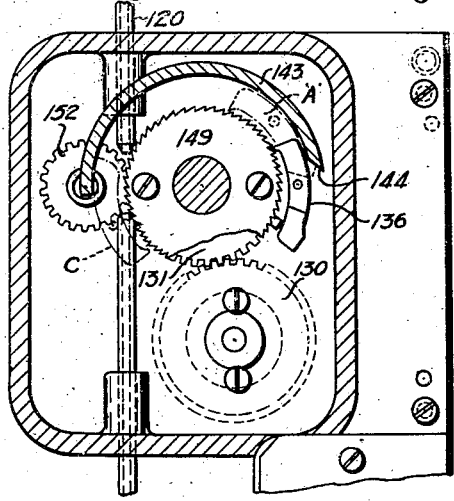
Figs. 20 and 21 are vertical sectional views taken substantially along the line 20—21 of Fig. 1, showing the wire feed mechanism set for minimum and maximum feed, respectively.
Figure 21:
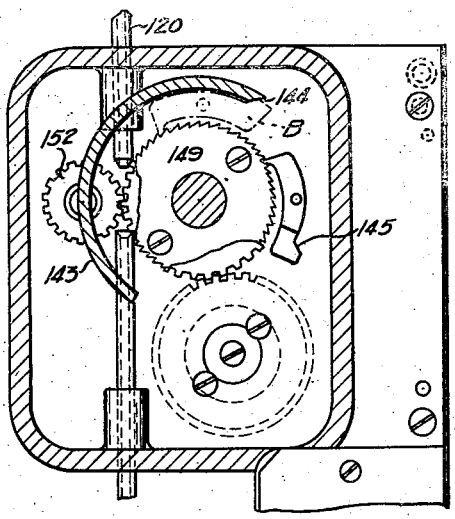

As the cross-head descends the rack 126 turns pinion 127. This motion is transmitted through gears 130 and 131 to pawl holder 134 which travels in a counterclockwise direction through something more than one-half a revolution. At the beginning of the descent the pawl 136 is always at the position indicated in full lines in Figs. 20 and 21. When the flange 143 is adjusted to the position of Fig. 20, the pawl remains in engagement with ratchet wheel 149 until it reaches the dotted line position A. Thereafter, on the rest of the descent of the cross-head the pawl is ineffective. The rotation of the wire feeding rollers 121 and 122 therefore takes place only during the early part of the descent of the cross-head. The flange 143 as illustrated in Fig. 20 is in the minimum feed position. It may be adjusted, by means of a spanner wrench, in engagement with holes 141, to any position between that of Fig. 20 and that of Fig. 21, the latter position being the maximum feed position. In the maximum feed position the pawl is not withdrawn from the ratchet wheel 149 until it reaches the dotted line position B shown in Fig. 21. In this latter case the wire feeding continues until the cross-head has descended somewhat less than half-way. The position of the pawl at the end of the down stroke is indicated at C in Fig. 20. On the up stroke of the cross-head the rack 126 of course rotates the pinion 127 and the gears 130 and 131 in the opposite direction, thereby returning the pawl holder to its original position, during which movement the pawl merely rides over the teeth on the ratchet wheel.

*Stitcher mechanism.*—The stitcher mechanism comprises two main elements, the former slide and the driver slide, as is usual in mechanisms of this kind. The former slide is shown at 165 and the driver slide at 166. As will appear from Fig. 33, the former slide has a guide groove 167 in its forward face which slidably receives the driver slide 166, the forward surfaces of the two slides being flush with each other.

The driver slide 166 is longer than the slide 165 and extends upward far enough to be secured to cross-head 125 by a series of fastenings 168. The slide 165 might be said to be a floating slide, as it has no positive connection with the cross-head nor with slide 166. A coil spring 169 is interposed between the cross-head and the slide 165, and extends at its lower end into a socket 170 in the top of former slide 165, projecting upwardly therefrom into a cylindrical bore 171 in the cross-head 125. This bore is threaded at its upper end to receive a threaded plug 172, which is a convenience in assembly and repair and also serves as an adjustment for the spring 169 should any adjustment be required.

Figures 16, 17:
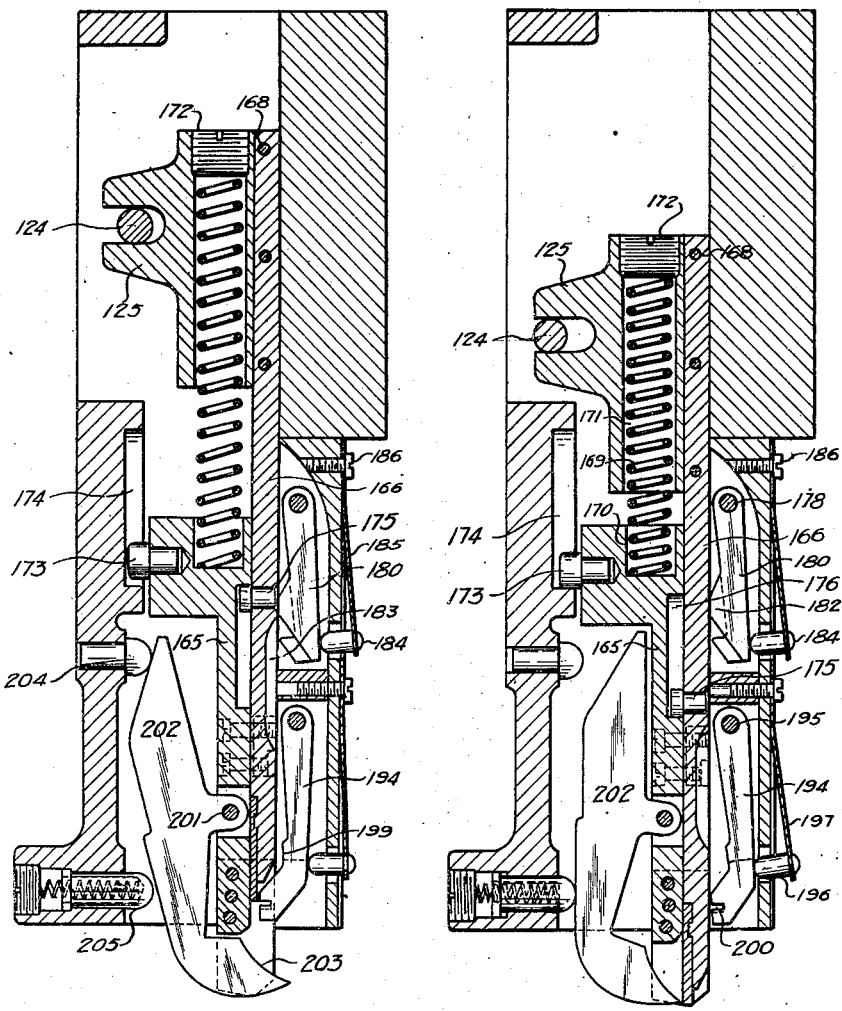
Figure 18:
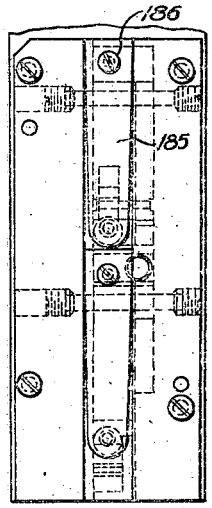
Fig. 18 is a detailed front elevational view on a larger scale of the lower portion of the stitcher head, looking in the direction of the arrows 18—18 of Fig. 14.

The movement of former slide 165 with respect to the casing is limited by a pin 173 set into the slide and running in a groove 174 in the casing. Relative movement between the two slides is also limited by a pin 175 set into the driver slide and running in a groove or slot 176 in the former slide. In the operation of the stitcher the driver slide moves downwardly from its top position, illustrated in Fig. 14, to the position shown in Fig. 15, the former slide remaining fixed. Then the former slide moves downward rapidly to the position of Fig. 16, and then to that of Fig. 17, where it remains while the driver slide continues its downward movement to drive and clinch the staple.

Figure 19:
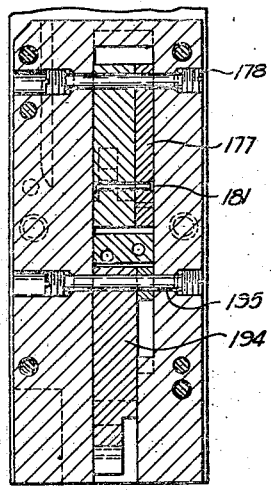
Fig. 19 is a vertical sectional view of the same taken on a plane parallel with the front face of the head as indicated by the line 19—19 of Fig. 14.

The former slide is held in the position of Fig. 14 during the first part of the downward movement of the cross-head by means of a latch 177 hung from a pivot 178 in the forward wall of the casing, this latch taking into a notch 179 in the former slide. 180 is a trip lever which is also hung upon pivot 178, and is fastened to latch 177 by a rivet or the like 181, see Fig. 19. On the rear face of lever 180 there is a cam 182 which runs in a cam slot 183 in the forward face of driver slide 166. The trip lever and latch are urged rearwardly by a pin 184 carried by the lower end of a flat spring 185, the upper end of which is attached to the casing by a screw 186. While the parts are in the position of Fig. 14, the latch 177 is in engagement with the notch 179, the cam 182 being accommodated by the cam groove 183. When the parts reach the position of Fig. 15 however the driver slide has descended far enough to cause the cam groove 183 to force the cam 182 forward, as indicated in that figure, and the latch 177 is thereby withdrawn from operative position. In the meantime, the spring 169 has been contracted to the extent that considerable energy has been built up in it. When the latch 177 releases the former slide therefore, the latter is driven down by the stored energy in the spring until the parts reach the position shown in Fig. 16, where the travel of the former slide with respect to the driver slide is interrupted by the stop pin 175. The two slides then move together for a very short distance, or until the stop pin 173 engages the lower end of slot 174, where the descent of the former slide is terminated positively. Further downward movement of the cross-head then serves to carry downwardly the driver slide 166 alone until such time as the stop pin 175 reaches the lower extremity of slot 176, which terminates the travel of that slide. The feeding movement of the wire feeding means all takes place during the first part of the descent of the cross-head, while the former slide 165 remains latched up. Consequently, when the former slide starts downward the wire for the staple is in position ready to be cut off and bent.

The cutting of the wire is performed by a knife 187 mounted in the lower end of one arm of the former slide, moving over the face of a small die 188 which has an aperture 189 through which the wire is projected. In Fig. 5 the machine is shown set up for comparatively long staples, while in Fig. 31 it is set up for short staples. This is accomplished by varying the distance between the knife 187 and the adjacent active face of the former slide, and by moving the block 190 in which the die 188 is carried. The inner face of this block is flush with the face of die 188, and is held up against the knife 187 and the former slide by a flat spring 191 secured to the casing at 192, as indicated in Fig. 5. The block 190 carries a wire guide 193 through which the wire passes on its way from the tubular guide 123 to the die 188.

In the casing in front of the slide guides, I mount an anvil lever 194 which is hung from a pivot 195 and is urged rearwardly by a pin 196 mounted in a flat spring 197, the latter being fastened to the casing by a screw 198. The anvil lever extends laterally on one side where it has a flat rear surface 199 which engages the forward surface of the former to hold the anvil in proper position for the reception of the wire which is caused to extend through the anvil slot 200, the latter being preferably inclined slightly upward on the right hand side so that the wire when fed through the anvil slot inclines upward slightly toward the right as viewed in Fig. 34. Consequently, when the former slide descends the wire is first gripped between the anvil and the right-hand portion of the former slide so as to be held securely during the wire cutting operation. Fig. 34 shows a length of wire gripped in this manner with the knife 187 about to sever the wire.

On a pivot 201 in the former slide I mount a shoe 202 which has a concave forward face 203 at its lower end that is adapted to extend beneath the formed staple and cooperate with the wire grooves in the internal faces of the former for supporting the staple until the driver slide forces it into the work. The upper part of the shoe is made cam shaped and arranged to engage a ball-headed pin 204 in the stitcher head casing. The lower part of the back of the shoe also has a cam surface which engages the end of a ball-headed spring plunger 205 mounted in the lower end of the casing.

The driver slide carries a hardened driver plate 206 which is adapted to engage the wire and do the work of driving the staple. A lower corner of the driver slide engages a cam surface on the toe of the anvil to push the latter forward out of the way just before the plate 206 comes into contact with the wire.

In driving the staple the shoe 202 is carried downwardly by the former slide. As soon as the shoe has passed the anvil the spring plunger 205 engages it and rocks it on its pivot until it assumes the position shown in Fig. 16. When the formers are resting on the work the shoe has been pushed all the way forward. The driver now moves downwardly pushing the staple before it. The underside of the crown of the staple bears on the concave surface on the front of the shoe, and as the staple enters the work the shoe is forced back out of the path of the staple by the staple itself and the rear corner of the driver plate 206. As the shoe moves back the spring in the ball-headed plunger 205 is compressed. The stitch having been driven, the driver slide moves upward, allowing the spring plunger 205 to again push the shoe 202 to its forward position. When the driver has moved upward until the pin 175 engages the upper end of slot 176, the former slide also starts to move upward, carrying the shoe with it. As the shoe rises it moves out of engagement with plunger 205, and the upper cam on the rear of the shoe comes in contact with the ball-headed pin 204 which, as the slide moves upward, rocks the point of the shoe back out of the path of the anvil.

*Operation.*—The functioning of the pedal mechanism and of the wire feeding mechanism, it is believed, will be clear from the foregoing description. The operation of the staple forming and driving mechanism however may be made somewhat clearer by a short statement of the steps which are performed. The operation is what I term a load and fire operation, because the steps of gripping the wire, cutting the wire, and forming the staple are all accomplished by a trigger release of energy which has been previously built up during the first portion of the down stroke of the cross-head. It is desirable that all of the operations of the wire feeding, gripping, and cutting, and staple forming and driving be performed during the down stroke of the cross-head. It is desirable also that the physical effort on the part of the operator and the length of pedal movement be kept within reasonable limits. It is obviously difficult to perform all of these operations seriatim with one push of the pedal. It is also obvious that certain of the steps require a greater amount of power than others. The wire feeding step for example is relatively easy as compared with the step of staple driving and clinching. It is best of course to distribute the effort as equally as possible throughout the pedal stroke.

In accordance with the present invention the pedal movement which must be employed for feeding the wire is also used for building up energy in a spring, and when that movement is completed the spring is released and the energy stored up therein performs almost instantaneously the gripping, cutting and bending of the wire staple, after which the final pedal movement is utilized for driving and clinching the staple.

The foregoing steps are illustrated in the order of performance in Figs. 14 to 17 inclusive. Fig. 14 shows the mechanism in its normal position with both slides at the tops of their strokes. When the operator depresses the foot pedal 59 the pin 124 in the forward end of the rock lever 64 moves downwardly in an arc from the position of Fig. 14 to that of Fig. 15, carrying down the cross-head 125 and driver slide 166 correspondingly. This part of the driver slide movement completes the wire feed and also compresses the spring 169. At the point illustrated in Fig. 15 the latch 177 is withdrawn and the former slide is released. The spring 169, in which considerable energy has been built up, immediately and forcibly drives the former slide downwardly, gripping the wire between the former and the anvil, as shown in Fig. 34, then severing the wire, and then bending the wire to form the staple. At the end of this movement the two side members of the former are resting upon the work and the staple is in position above the work ready to be driven. This is the stage illustrated in Fig. 16. Thereafter the stop pin 173 holds the former slide while the driver slide continues its downward movement for driving and clinching the staple.

The operator now releases his pressure on the pedal and the cross-head 125 moves upward. In the first part of the upward movement the driver slide 166 carries pin 175 upward until it strikes the top of slot 176. Thereupon the former slide 165 is carried upwardly with the driver slide until the pin 173 strikes the top of slot 174, in other words until the parts are again in their original position of Fig. 14. At that time the latch lever 177 swings rearwardly, latching up the former slide. All of the parts, including the ratchet pawl 136 of the wire feeding mechanism, are then in condition for performing the next stitch.

In the foregoing description I have necessarily gone somewhat into detail in order to explain fully the particular embodiments of the invention herein illustrated, but I desire it to be understood that such detail disclosures are not to be construed as amounting to limitations, except as they may be included in the appended claims.

Having thus described my invention, I claim:

1. In a stapling machine, a hollow supporting column, a clincher arm pivoted to said column, said column having a slot in the front wall thereof below said pivot to enable the arm to enter the column when it is swung down into inoperative position, and a screw mounted in the rear wall of the column adapted to engage said arm for supporting it in the operative position and also for securing it in the inoperative position.

2. In a stapling machine, a hollow supporting column, a clincher arm pivoted to said column, said column having a slot in the front wall thereof below said pivot to enable the arm to enter the column when it is swung down into inoperative position, the pivot for the arm being positioned near the front wall of the column and near the upper edge of the arm, and a screw mounted in the rear wall of the column below the level of said pivot adapted to engage the arm for supporting it in the operative position and also for securing it in the inoperative position.

3. In a stapling machine, a hollow supporting column, a stitcher head carried thereby, a clincher arm pivoted to said column and adapted when not in use to be folded down into the column, and means for operating said stitcher head comprising a bar vertically movable in said column and located to one side of the folded arm.

4. In a stapling machine, a base, a column mounted in one end of said base, stitching mechanism mounted on the column, a clincher post pivotally mounted in the other end of the base to tilt on a transverse axis, means mounted approximately along the central longitudinal plane of the base for tilting said post, a lever mounted in the opposite end of the base substantially along said central longitudinal plane, mechanism operated by the lever for actuating the stitching mechanism of the machine, a foot pedal mounted on either side of the base, and operative connection between one of said pedals and said post tilting means and between the other of said pedals and said lever.

5. In a stapling machine, a base, a clincher post pivotally mounted above its lower extremity in the front end of said base to tilt on a transverse axis, a transverse rock shaft mounted in the base to the rear of the post, a foot pedal secured to said shaft and extending forwardly to one side of the pivotal mounting of the post, and operative connections located within the base extending from said rock shaft to the lower end of said post within the base for causing the oscillations of said shaft to impart tilting movements to said post.

6. In a stapling machine, a base, a clincher post pivotally mounted in the front end of said base to tilt on a transverse axis, a transverse rock shaft mounted in the base to the rear of said post, a foot pedal secured to said shaft and extending forwardly to one side of the pivotal mounting of the post, operative connections located within the base for causing the oscillations of said shaft to impart tilting movements to said post, a stop for limiting the movement of the post in one direction, and a tension spring mounted in the base acting upon said shaft and through said connections to hold the post up against the stop.

7. In a stapling machine, a former slide, a driver slide, operating means operatively connected with the driver slide for reciprocating the latter, a spring between the driver slide and former slide adapted to be energized as the driver slide descends relatively to the former slide, means for latching up the former slide during the first part of the movement of the driver slide, and means for releasing said latching means when the driver slide has descended to a predetermined point.

8. In a stapling machine, a former slide, a driver slide, wire feeding means, means for reciprocating the driver slide, operative connections between the driver slide and the wire feeding means for feeding a length of wire during the first part of the descent of the driver slide, a spring between the driver slide and former slide adapted to be energized as the driver slide descends relatively to the former slide, means for latching up the former slide during the said first part of the movement of the driver slide, and means for releasing said latching means at the end of said first part of the driver slide movement.

9. In a stapling machine, a former slide, a driver slide, a cross-head slidable up and down, and operative connections between said cross-head and slides acting to depress said driver slide only for a predetermined distance, and then to force down the former slide rapidly to its operative position for forming the staple, the movement of the driver slide continuing thereafter for the driving of the staple.

10. In a stapling machine, a former slide, a driver slide, operating means for imparting a continuous downward movement to the driver slide, a load and fire means actuated by the driver slide for building up energy above the former slide during the first part of the downward movement of the driver slide and for releasing said energy at a predetermined point in the descent of the driver slide to force the former slide rapidly down to operative position.

11. In a stapling machine, a former slide, a driver slide, operating means for imparting downward movement to the driver slide, a latch for holding the former slide in elevated position, a spring interposed between the driver slide and former slide which is energized while the former slide is latched up and the driver slide is descending, and cam means actuated by the driver slide for releasing said latch when the driver slide reaches a predetermined position, whereupon the former slide is forced rapidly downward by the said spring.

12. In a stapling machine, a former slide, a driver slide, stop means for limiting the extent of downward travel of the former slide, stop means between the former slide and driver slide for limiting the relative vertical movement between the two slides, and operating means for imparting downward movement to the driver slide until said relative movement is taken up, continuing said downward movement of the driver slide and moving the former slide downward to the extent of its possible movement, continuing the downward movement of the driver slide until the relative movement is again taken up, raising the driver slide until the relative movement between them is taken up, then raising the two slides together until they both reach the tops of their strokes.

WILLIAM O. SIMS.